United States Patent [19]

Buchwald

[11] 4,159,125

[45] Jun. 26, 1979

[54] UNCOUPLED STRUT SUSPENSION SYSTEM

[75] Inventor: Robert M. Buchwald, Birmingham, Mich.

[73] Assignee: General Motors Corporation, Detroit, Mich.

[21] Appl. No.: 848,381

[22] Filed: Nov. 4, 1977

[51] Int. Cl.² .............................................. B62D 7/06
[52] U.S. Cl. .................................. 280/667; 180/43 R; 267/20 A; 280/673; 280/696
[58] Field of Search ...................... 280/96.1, 663, 666, 280/667, 668, 673, 675, 696, 701, 67 A; 267/15 R, 20 R, 20 A

[56] References Cited

U.S. PATENT DOCUMENTS

| 2,935,334 | 5/1960 | Felts | 280/666 |
| 2,967,066 | 1/1961 | Mueller | 280/692 |
| 3,333,653 | 8/1967 | Eirhart | 280/666 |
| 3,771,813 | 11/1973 | Stotz | 280/697 |
| 3,926,454 | 12/1975 | Van Winsen | 280/701 |

Primary Examiner—Joseph F. Peters, Jr.
Assistant Examiner—John A. Carroll
Attorney, Agent, or Firm—Dean L. Ellis

[57] ABSTRACT

The drawings illustrate a strut-type suspension system used with a front wheel drive vehicle and including a preassembled shock absorber and elongated coil spring retainer member having the respective upper ends thereof resiliently mounted in juxtaposition on a mounting bracket, and a coil spring connected to the retainer member. The lower end of the shock absorber is adapted to being secured to the steering knuckle behind the drive axle, and the coil spring is adapted to being confined between the bottom end of the retainer member and a retainer seat formed on a control arm in front of the drive axle. The bracket of the subassembly is adapted to being mounted in a laterally extending attitude at the top of the wheel well.

5 Claims, 3 Drawing Figures

UNCOUPLED STRUT SUSPENSION SYSTEM

This invention relates generally to vehicle suspension systems and, more particularly, to such suspension systems for use with a front wheel drive vehicle wherein the shock absorber and coil spring are uncoupled and assembled as a complete subassembly prior to installation on the vehicle.

Heretofore, strut-type suspension systems have generally employed a shock absorber mounted on either the steering knuckle or on the control arm, with a coil spring mounted either concentrically or eccentrically around the shock absorber or mounted completely uncoupled from the shock absorber on either the steering knuckle or the control arm. Such arrangements have generally required that the individual components be assembled on the vehicle at various stations along the assembly line. It is of considerable production advantage to be able to completely subassemble the major components of an uncoupled strut-type suspensions off the assembly line and then mount same as a unit on the vehicle, which may incorporate a front wheel drive.

Accordingly, an object of the invention is to provide an improved uncoupled strut-type suspension system arrangement which may include components that are assembled as a separate subassembly and mounted as a unit on a front wheel drive vehicle.

Another object of the invention is to provide an improved uncoupled strut suspension system wherein the shock absorber and spring have their lower ends mounted on the steering knuckle and control arm, respectively, such that the lower end of the shock absorber is extended downwardly past the drive axle on the rearward side thereof for a lower overall strut height, while the upper ends of the shock absorber and coil spring are resiliently secured in a side-by-side attitude to a mounting bracket located at the top of the wheel well.

A further object of the invention is to provide an uncoupled strut-type suspension system for a front wheel drive vehicle including a laterally extending control arm and a steering knuckle pivotally connected to the outer end of the control arm for rotatably supporting a wheel, wherein the remaining components of the suspension system can be assembled off the assembly line as a preassembled unit. The latter includes a vertically oriented shock absorber having its lower end adapted to being secured to the steering knuckle rearward and adjacent or below the drive axle for providing a low profile, and the upper end thereof secured to a bracket adapted to being mountable on the body at a point which together with the axis of the pivotal connection between the steering knuckle and the control arm defines a predetermined kingpin axis, a spring retainer member secured at its upper end to the bracket in a fixed angular relationship with the shock absorber, and a coil spring operatively connected to the lower end of the retainer member and adapted to being mounted on a retainer surface formed on the control arm forward of the drive axle, the spring being connected to the retainer member by suitable clamp means prior to assembly on the vehicle.

These and other objects and advantages of the invention will be apparent when reference is made to the following description and accompanying drawings, wherein.

Figure 1:
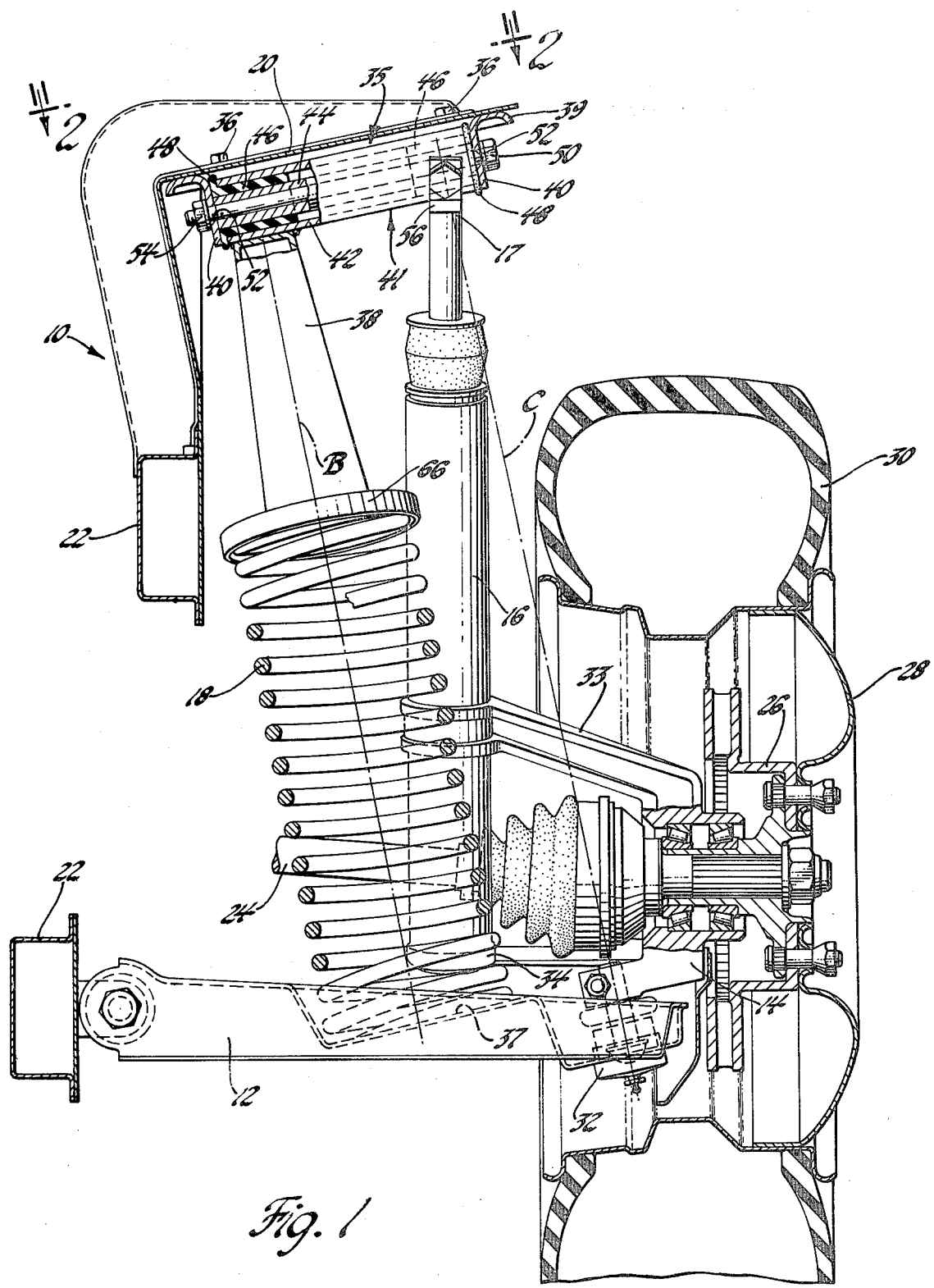
FIG. 1 is a fragmentary cross-sectional view of a vehicular front wheel drive, strut-type suspension system embodying the invention.
Figure 2:
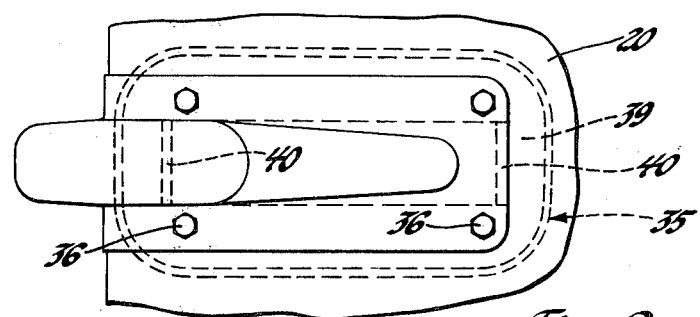
FIG. 2 is a top plan view taken along the plane of the line 2—2 of FIG. 1, and looking in the direction of the arrows.

Referring now to the drawings in greater detail, FIG. 1 illustrates a front suspension system 10 including, generally, a control arm 12, a steering knuckle 14, a shock absorber 16 having a piston rod 17 extending therefrom, and a coil spring 18 for use with a front wheel drive vehicle including a body and frame, represented at 20 and 22, respectively and a front wheel drive axle 24, with the usual wheel hub 26 being rotatably mounted on the steering knuckle 14 and a conventional wheel 28 and tire 30 mounted on the hub 26.

More specifically, as a complete system, the control arm 12 is pivotally connected at its inner end to the frame 22 and at its outer end via a ball joint 32 to the steering knuckle 14. The shock absorber 16 is connected via suitable brackets 33 and 34 at its lower end to the steering knuckle 14 and at its upper end to a mounting bracket assembly 35. The latter is secured to the body 20 at the top of the wheel well by bolts 36, and the coil spring 18 is mounted between a retainer seat 37 formed on the control arm 12 and an elongated retainer member 38 secured to the mounting bracket 35 alongside the shock absorber 16, as will be more fully explained.

The mounting bracket assembly 35 includes a flanged plate-like bracket 39 having mounting walls 40 formed at opposite ends thereof. A resilient bushing assembly 41 includes outer and inner metal sleeves 42 and 44, respectively, with two spaced elastomeric bushings 46 confined therebetween, each bushing 46 having a flange 48 extending past an end of the outer sleeve 42. The assembly 41 is mounted between the mounting walls 40, and a bolt or shaft 50 is extended through apertures 52 formed in the two mounting walls 40 and through the inner sleeve 44 to confine the latter having opposite ends of the inner sleeve 42 and the flanges 46 of the elastomeric bushings 44 therebetween. A nut 54 is threadedly mounted on the extended end of the bolt 50. If desired, short bolts could be threadedly mounted in each end of the inner sleeve 44, in lieu of the long bolt 50.

Figure 3:
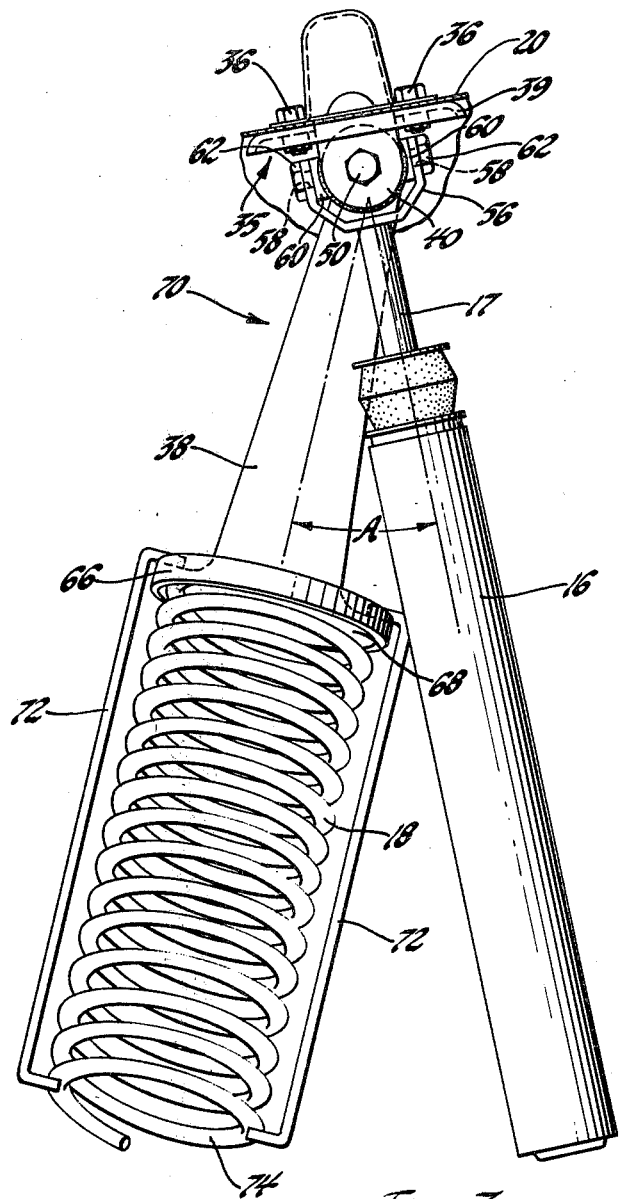
FIG. 3 is a side elevational view of the inventive suspension system as a preassembled unit.

As shown in FIG. 3, a substantially U-shaped bracket 56 is secured at a central portion thereof to the upper end of the shock absorber piston rod 17 in any suitable manner, such as by welding. The legs of the bracket 56 extend to opposite sides of the outer sleeve 40. An aperture 58 is formed in each leg adjacent the end thereof, directly opposite a threaded fastener 60 secured in any suitable manner, such as by welding, to a side of the outer sleeve 40. A short bolt 62 is mounted through each aperture 58 and threadedly secured to the adjacent fastener 60.

The elongated spring retainer member 38 is secured in any suitable manner, such as by welding, to the outer sleeve 40 at the end thereof opposite the U-shaped bracket 56 to define a predetermined angle A with respect to the shock absorber 16, as seen in the end view and shown in FIG. 3. A flange 66 is formed on the lower end of the retainer member 38, providing a retainer seat 68 adapted to receive the upper end of the coil spring 18 whose lower end mounts on the retainer seat 37 formed on the control arm 12 adjacent the ball joint end thereof, forward of the drive axle 24 and along an axis B between the centers of the retainer seats 68 and 37. The kingpin axis C is defined by the center of the connection of the upper end of the shock absorber 16 with the body 20 and the center of the pivotal ball joint 32 connection between the steering knuckle 14 and the outer end of the control arm 12.

As a subassembly 70, as shown in FIG. 3, a pair of suitable clamps 72 may be mounted between the upper edge of the flange 66 of the spring retainer member 38 and the bottom coil 74 of the spring 18, on opposite sides thereof, compressing the coil spring 18 between the respective retainer seats 68 and 37 until such time as the subassembly 70 is attached to the vehicle along an assembly line.

As shown in FIG. 1, the lower end of the shock absorber 16 may be inserted through the upper bracket 33 and seated in the lower bracket 34 at assembly. If desired, the upper bracket 33 may include a suitable split clamp (not shown) which is secured together at assembly.

In the above arrangement, in view of the lower end of the shock absorber 16 extending a substantial distance below the axis of the drive axle 24 and the wheel 28, it is apparent that the upper end of the shock absorber 25 defines a low profile configuration suitable for use with a vehicle designed with a low hood height. Also, by virtue of the shock absorber 16 extending rearwardly of the drive axis, the angle thereof may be selected so as to provide preferable anti-dive and anti-lift characteristics in response to movement of the spring 18 and components of the shock absorber through the jounce space from the fully compressed position to the full rebound position during braking and accelerating operations.

It should be apparent that the invention provides an improved uncoupled strut-type suspension system arrangement which may be assembled as a separate subassembly and mounted as a unit on a front wheel drive vehicle.

While but one embodiment of the invention has been shown and described, other modifications thereof are possible.

The embodiments of the invention in which an exclusive property or privilege is claimed are defined as follows:

1. In a suspension system on a motor vehicle having a frame supporting a body, a drive axle, and a road wheel operatively connected to the outer end of the drive axle, and including a laterally extending control arm having the inner end thereof pivotally connected to the frame, and a steering knuckle pivotally connected to the outer end of the control arm and surrounding the drive axle for rotatably supporting the wheel, the improvement comprising mounting bracket means mounted in a predetermined lateral attitude on the body of the vehicle above the drive axle and including a laterally oriented connector bushing, a telescopic shock absorber having the upper end thereof secured to the connector bushing and the lower end thereof secured to the steering knuckle rearward of the drive axle, on elongated coil spring retainer member secured at the upper end thereof to the connector bushing in juxtaposition with the upper end of the telescopic shock absorber, the elongated coil spring retainer and shock absorber diverging downwardly from the connector bushing so that the axes thereof define a predetermined angle therebetween as seen in the side view of the vehicle, and a coil spring mounted between the lower end of the elongated retainer member and the control arm forward of the drive axle with the axis of the coil spring coincident with the axis of the elongated coil spring retainer member.

2. In a suspension system on a motor vehicle having a frame supporting a body, a drive axle, and a road wheel operatively connected to the outer end of the drive axle, and including a laterally extending control arm having the inner end thereof pivotally connected to the frame, and a steering knuckle pivotally connected to the outer end of the control arm and surrounding the drive axle for rotatably supporting the wheel, the improvement comprising a mounting bracket including inner and outer end wall portions mounted in a predetermined lateral attitude on the body above the drive axle and having an opening formed through each end wall portion, a support shaft secured adjacent its ends in the openings, resilient bushing means mounted around the support shaft intermediate the end wall portions, a telescopic shock absorber having the upper end thereof secured to the resilient bushing means and the lower end thereof secured to the steering knuckle rearward of the drive axle, an elongated coil spring retainer member secured at the upper end thereof to the resilient bushing means in juxtaposition with the upper end of the telescopic shock absorber, the elongated coil spring retainer and shock absorber diverging downwardly from the resilient bushing means so that the axes thereof define a predetermined angle therebetween as seen in the side view of the vehicle, a downwardly facing retainer seat formed on the lower end of the retainer member, an upwardly facing retainer seat formed adjacent the outer end of the control arm forward of the drive axle, and a coil spring mounted at the upper end thereof in the downwardly facing retainer seat of the elongated retainer member and at the lower end thereof on the upwardly facing retainer seat of the control arm so that the axis of the coil spring is coincident with the axis of the elongated coil spring retainer member.

3. For use in a suspension system on a motor vehicle having a frame supporting a body, a drive axle, and a road wheel operatively connected to the outer end of the drive axle, and including a laterally extending control arm having the inner end thereof pivotally connected to the frame, and a steering knuckle pivotally connected to the outer end of the control arm and surrounding the drive axle for rotatably supporting the wheel, an uncoupled strut subassembly comprising a mounting bracket adapted to being mounted on the body above the drive axle, a support shaft secured to the bracket, resilient bushing means mounted around the support shaft, a telescopic shock absorber having the upper end thereof secured to the resilient bushing means and the lower end thereof adapted to being secured to the steering knuckle rearward of the drive axle, an elongated coil spring retainer member secured at the upper end thereof to the resilient bushing means in juxtaposition with the upper end of the telescopic shock absorber, the elongated coil spring retainer and shock absorber diverging downwardly from the resilient bushing means so that the axes thereof define a predetermined angle therebetween as seen in the end view of the bracket, a coil spring mounted at the upper end thereof against the lower end of the elongated retainer member, and removable clamp means mounted between the retainer member and the bottom of the coil spring for compressing the coil spring a predetermined amount and retaining it as a component of the subassembly prior to assembly on the vehicle.

4. For use in a suspension system on a motor vehicle having a frame supporting a body, and including a laterally extending control arm having the inner end thereof pivotally connected to the frame, and a steering knuckle pivotally connected to the outer end of the control arm for rotatably supporting a wheel, an uncoupled strut subassembly comprising a mounting bracket adapted to being mounted on the body and including oppositely disposed end walls, resilient bushing means mounted between the end walls, fastener means for securing said resilient bushing means to said end walls, a telescopic shock absorber having the upper end thereof secured to the resilient bushing means and the lower end thereof adapted to being secured to the steering knuckle, an elongated coil spring retainer member secured at the upper end thereof to the resilient bushing means in juxtaposition with the upper end of the telescopic shock absorber, the elongated coil spring retainer and shock absorber diverging downwardly from the resilient bushing means so that the axes thereof define a predetermined angle therebetween as seen in the end view of the bracket, a coil spring mounted at the upper end thereof against the lower end of the elongated retainer member, and removable clamp means mounted between the retainer member and the bottom of the coil spring for compressing the coil spring a predetermined amount and retaining it as a component of the subassembly prior to assembly on the coil spring on the control arm.

5. A suspension system on a motor vehicle having a frame supporting a body, a drive axle, and a road wheel operatively connected to the outer end of the drive axle, said suspension system comprising a laterally extending control arm having the inner end thereof pivotally connected to said frame, a steering knuckle pivotally connected to the outer end of said control arm and surrounding said drive axle for rotatably supporting said wheel, a mounting bracket including oppositely disposed end walls mounted in a predetermined lateral attitude on said body above the drive axle and having an opening formed through each end wall, resilient bushing means including outer and inner metal sleeves, an elastomeric bushing confined between said sleeves adjacent each end thereof, a support bolt extended through said end walls and said inner sleeve such that said resilient bushing means is mounted intermediate said end walls, a telescopic shock absorber having the upper end thereof secured to said outer metal sleeve and the lower end thereof secured to said steering knuckle rearward of said drive axle, an elongated coil spring retainer member secured at the upper end thereof to said outer metal sleeve in juxtaposition with the upper end of the telescopic shock absorber, said elongated coil spring retainer and shock absorber diverging downwardly from said outer metal sleeve so that the axes thereof define a predetermined angle therebetween as seen in the end view, a downwardly facing retainer seat formed on the lower end of said retainer member, an upwardly facing retainer seat formed adjacent the outer end of said control arm forward of said drive axle, and a coil spring mounted at the upper end thereof in said downwardly facing retainer seat and at the lower end thereof on said upwardly facing retainer seat so that the axis of said coil spring is coincident with the axis of said elongated coil spring retainer member.

* * * * *